United States Patent Office 3,157,393
Patented Nov. 17, 1964

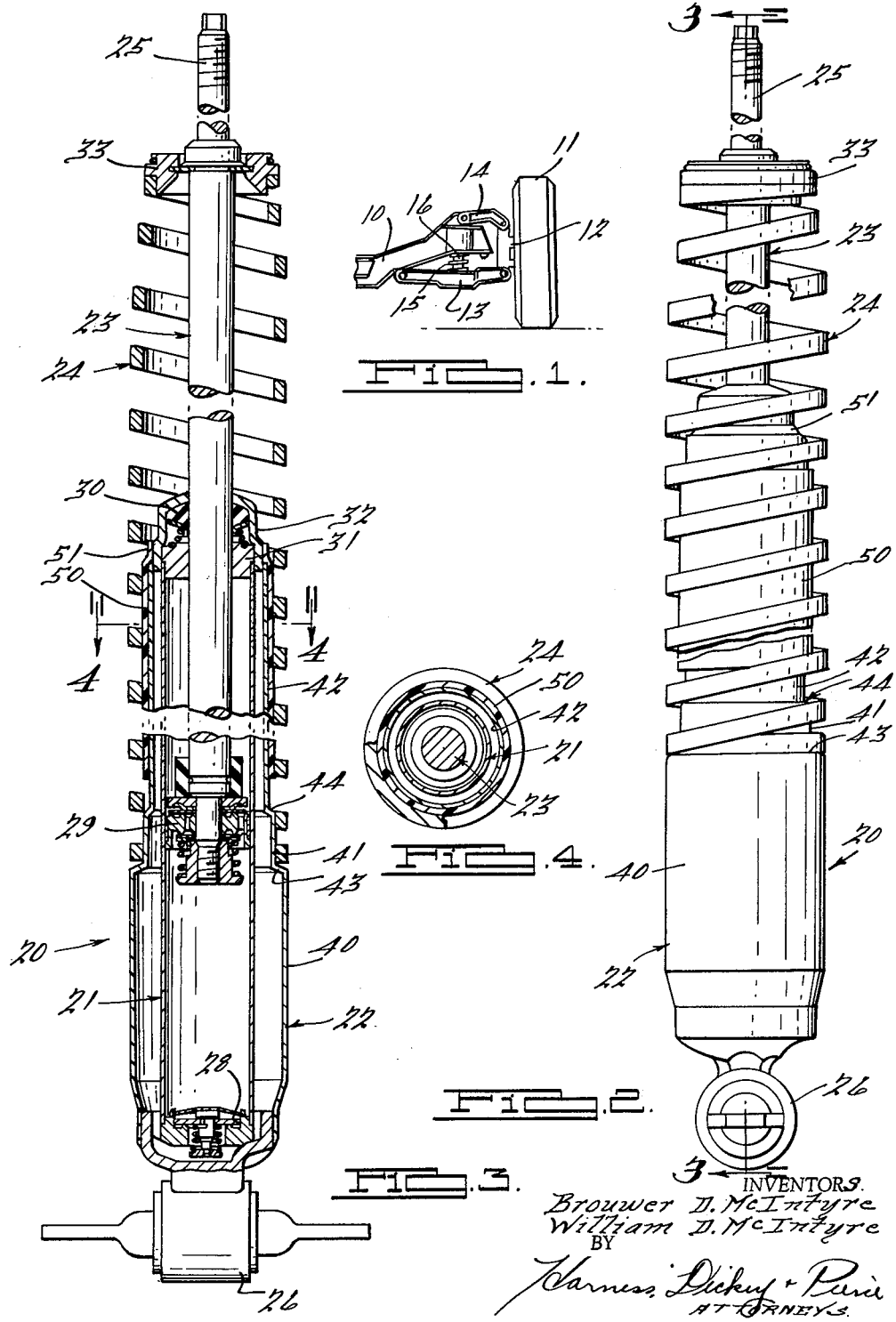

3,157,393
VEHICLE STABILIZING UNIT
Brouwer D. McIntyre and William D. McIntyre, Monroe, Mich., assignors, by mesne assignments, to Monroe Auto Equipment Company, a corporation of Michigan
Filed July 16, 1962, Ser. No. 210,015
4 Claims. (Cl. 267—8)

This invention relates to vehicle suspension systems and more particularly to a suspension system comprising a main spring, an auxiliary spring and a hydraulic shock absorber in which the auxiliary spring is carried by the shock absorber. In such devices, the shock absorber is calibrated relative to both the main and auxiliary springs whereby to provide improved suspension characteristics when the vehicle to which the device is attached is both lightly loaded and heavily loaded.

More specifically, this invention relates to stabilizing units for motor vehicles, one type of which is well known in the automotive industry and is commercially sold under the trademark "Load-Leveler." This type of stabilizing unit, which is shown in McIntyre et al., Patent Number 2,874,955, has heretofore been designed for use between the sprung and unsprung assemblies at the rear of the vehicle. In this location, space is not as serious a problem as it is at the front of the vehicle, and no difficult limitations were placed on the over-all dimensions of the device.

However, the present stabilizing unit is particularly designed for use on the front end of a motor vehicle where the available space is limited and the utility and efficacy of the device depends to a large degree upon its compactness. The over-all size of the device becomes especially important when the vehicle is equipped with coil springs and the devices of this invention are mounted within these coil springs.

The present device is designed as a companion unit to cooperate with and complement the action of the rear stabilizing units, above mentioned, now in widespread use and to provide, in conjunction therewith, for an improved ride control and a completely stabilized vehicle suspension system.

The front stabilizing unit of this invention is particularly adapted to overcome front end sagging, prevent bottoming, insure safer and surer cornering, prolong tire life, help maintain wheel alignment, prevent sidesway in crosswinds, and otherwise provide a more stable ride.

One of the principal objects of this invention is to provide a device of this type which is distinguished by its over-all compactness and wherein the greatest external diameter of the device is reduced to a minimum without a sacrificial reduction in the capacity of the shock absorber.

The compactness of the stabilizing unit of this invention is attained by a novel construction and arrangement of parts wherein a shock absorber of adequate capacity is provided within a structure of minimal over-all size. In order to obtain these results, the reserve chamber tube is provided with portions of three different diameters decreasing in size from the lower end to the upper end thereof, thereby providing the greatest reserve chamber space adjacent the lower end of the pressure cylinder where communication between these chambers is established. Annular shoulders are formed at the junctures of the portions of different diameters. The lowermost shoulder forms the seat for the spring which is preferably formed of a rectangular wire, the spring having a diameter no greater than the outer diameter of this shoulder. The portion of intermediate diameter forms a centering boss for centering the spring adjacent the end thereof which engages the aforesaid shoulder. The portion of smallest diameter has a tubular member of nonmetallic material sleeved thereover to prevent metal-to-metal contact between the spring and the reserve chamber tube. The outer diameter of this tubular member is no greater than the outer diameter of the second shoulder. With such a construction, a degree of compactness is obtained not heretofore possible in devices of this type. Moreover, this compactness is obtained without affecting the efficacy of the stabilizing unit.

Another object of the invention is to provide a device of this type adapted to replace the front shock absorbers on the vehicle and which will perform the functions of the replaced shock absorbers and the added functions outlined above.

Further objects of this invention are to provide a device of this type which is efficient, durable, compact, and of simple construction, comprising a minimum number of parts, whereby it may be economically manufactured, assembled with facility, and quickly and easily installed.

Various other objects and advantages and the novel details of construction of a commercially practical embodiment of the invention will become more apparent as this description proceeds, especially when considered in connection with the accompanying drawings, in which:

FIGURE 1 is a fragmentary elevational view showing the suspension system of this invention incorporated with the front wheel of an automotive vehicle;

FIGURE 2 is an elevational view of a suspension device embodying the invention;

FIGURE 3 is a longitudinal sectional elevational view through the device shown in FIGURE 2; and FIGURE 4 is a detail sectional view taken substantially on the plane indicated by line 4—4 in FIGURE 3.

Referring now to the drawings and more particularly to FIGURE 1, it will be noted that there is fragmentarily illustrated one of the front steering wheels of an automotive vehicle and its complementary structure involving a frame member 10 constituting a part of the sprung assembly and a wheel 11 mounted on an axle spindle 12 carried by a pair of arms 13 and 14 pivotally supported on the frame member 10 and constituting the unsprung assembly. In many of the present-day automotive vehicles, the sprung assembly 10 of the vehicle is connected to the unsprung assembly by means of a coil spring 15 and frequently a shock absorber 16 is arranged within the spring 15 between the sprung and unsprung assemblies. It is for the purpose of replacing the shock absorber 16 that the present invention was designed.

The suspension device of this invention consists of a shock absorber indicated generally by the reference character 20 which may be of any desired or preferred type, but is preferably of the type shown in McIntyre et al. Patent 2,874,955, dated February 24, 1959. The shock absorber includes a pressure cylinder 21, a reserve chamber 22, and a piston rod 23. A coil spring 24 is associated with the shock absorber. The upper end 25 of the piston rod is adapted to be connected by a fitting (not shown) to the sprung assembly and by a fitting 26 to the unsprung assembly.

The lower end of the pressure cylinder 21 is connected to the reserve chamber 22 at the lower end of the shock absorber by means of a base valve assembly 28 adapted to permit controlled communication between the pressure cylinder and the reserve chamber. Secured to the lower end of the piston rod 23 is a piston 29 having ports and valve means for controlling the flow of hydraulic fluid from one side of the piston to the other during the operation of the shock absorber. As mentioned above, these valve mechanisms may be the same as those shown in the McIntyre et al. Patent 2,874,955, and, inasmuch as they form no particular part of this invention, they will not be described in detail.

The piston rod 23 passes through a packing 30 and a guide 31 contained within a cap 32 secured to the upper end of the reserve chamber tube 22.

Secured to the upper end of the piston rod 23 is a spring support 33 with which the upper end of the coil spring 24 engages.

As mentioned heretofore, one of the principal objects of this invention is to provide a suspension device which is more compact than those heretofore manufactured and wherein the greatest external diameter of the device is reduced to a minimum without a sacrificial reduction in the capacity of the shock absorber.

In accordance with this invention, the reserve chamber tube 22 is formed with portions 40, 41 and 42 of three different diameters decreasing in size from the lower end to the upper end thereof. Thus, the portion 40 of largest diameter is located adjacent the lower end of the pressure cylinder 21 adjacent the valve controlled communication 28 therewith. Thus, the greatest capacity of the reserve chamber tube and hence the greatest amount of reserve fluid is located immediately adjacent the point where the cylinder and reserve chamber communicate.

An annular shoulder 43 is formed between the portion 40 of largest diameter and the portion 41 of intermediate diameter, and an annular shoulder 44 is formed between the portion 41 of intermediate diameter and the portion 42 of smallest diameter. The shoulder 43 forms a seat for the lower end of the spring 24. The portion of intermediate diameter forms a centering boss for centering the spring adjacent the end thereof which engages the shoulder 43.

The spring 24 is preferably manufactured from rectangular wire of valve spring quality and is specially toughened for greater durability. By employing rectangular wire in making the spring 24, the diameter of the spring is reduced to a minimum without reducing its capacity. As shown, the spring is of a diameter no greater than the outer diameter of the shoulder 43 or the largest portion 40 of the tube 22. The centering boss 41 not only centers the spring 24, but prevents displacement of the spring from its seat 43.

The reference character 50 indicates a tubular member of nonmetallic material which is sleeved over the portion 42 of smallest diameter of the reserve chamber tube and is secured to the cap 32 by being swaged or contracted thereon, as indicated at 51. This nonmetallic tubular member 50 may be formed of an acetal resin composition derived by the polymerization of formaldehyde, one form of which is known by the trademark "Delrin." However, obviously, other types of nonmetallic material may be employed. This tubular member prevents metal-to-metal contact between the spring and the reserve chamber tube.

The tubular member 50 extends from the cap member 32 to a point adjacent the shoulder 44 and is of no greater diameter than the outer diameter of the shoulder 44.

From the foregoing description of the device, it will be obvious that the reserve chamber tube not only functions to locate the largest supply of fluid adjacent the point of communication with the pressure cylinder, but also acts as a direct support through its shoulder 43 for one end of the spring and through the centering boss 41 to center the spring and hold it on its seat. The portion 42 of smallest diameter provides means for accommodating the nonmetallic tubular member 50. By using rectangular wire in the formation of the coil spring, the capacity of the spring is maintained and its over-all diameter reduced to a minimum; that is, to a diameter no greater than the portion 40 of largest diameter of the reserve chamber tube. With such a construction, a degree of compactness is obtained which was not heretofore possible in devices of this type, and this compactness is obtained without affecting the efficacy of the stabilizing unit.

As shown in FIGURE 1, the over-all diameter of the stabilizing device is such that it may be located within the coils of the main coil spring of a car suspension without interference therewith. Or, if other types of spring suspensions are used on the vehicle, the stabilizing unit of this invention may be connected to the sprung and unsprung assemblies of the vehicle in locations otherwise unable to accommodate the device.

As stated in Patent 2,874,955, it is the normal practice to calibrate the shock absorbers with respect to the main suspension springs on a motor vehicle in order to provide the desired suspension system for the vehicle. Also, the compression resistance of a shock aborber depends upon the loading of the valve disks in the piston and base valve assembly, and by changing the springs or valve disk arrangements, the compression resistance of the shock absorber can be varied. Moreover, in some instances, the sizes of the openings or passageways in the piston and base valve assemblies may be varied to provide certain orifice or velocity control in the shock absorber, so that the shock absorber resistance can be calibrated in terms of both pressure and velocity control. However, in view of the fact that these features of the shock absorber, per se, have been described in detail in Patent 2,874,955, and form no part of the present invention, they have not been treated in detail herein.

While a commercially practical embodiment of the invention has been described and illustrated herein somewhat in detail, it will be understood that various changes may be made as may come within the purview of the accompanying claims.

What is claimed is:

1. An auxiliary suspension device for automobiles comprising a hydraulic direct-acting tubular shock absorber including a tubular pressure cylinder, a piston slidably mounted in said pressure cylinder, valve means associated with said piston for controlling the flow of hydraulic fluid from one side of said piston to the other side thereof, a reserve chamber tube concentrically surrounding said cylinder in spaced relation thereto, valve means normally closing one end of said pressure cylinder and providing communication between said pressure cylinder and said reserve chamber tube, a piston rod connected to said piston, means closing the upper ends of said pressure cylinder and reserve chamber tube and slidably receiving said piston rod, means on the lower end of said reserve chamber and on the upper end of said piston rod for connecting said parts to the unsprung and sprung assemblies of the vehicle, said reserve chamber tube being formed with portions of three different diameters decreasing in size from the lower end thereof to the upper end thereof and forming shoulders of different diameters therebetween, the lowermost shoulder constituting a spring seat, the intermediate diameter portion forming a centering boss, a coil spring sleeved over said reserve chamber tube and engaging said centering boss to center said spring and engaging said shoulder to support one end of said spring, the outer diameter of said spring being no greater than the outer diameter of said shoulder, a tubular member of nonmetallic material sleeved over the smallest diameter portion of said reserve chamber tube and extending from the outer end of said reserve chamber tube to a point adjacent the other of said shoulders to prevent metal-to-metal contact between said spring and said reserve chamber tube, the outer diameter of said tubular member being no greater than the outer diameter of said latter shoulder, and means on the piston rod for supporting the other end of said spring.

2. In an automobile suspension system the combination including a sprung assembly and an unsprung assembly, main suspension springs supporting said sprung assembly on said unsprung assembly and including coil springs, a tubular direct acting hydraulic shock absorber extending through each of said coil springs and including relatively movable telescopic parts connected with said sprung and unsprung assemblies, one of said parts including a tubular member having portions formed of different diameters providing shoulders therebetween, an auxiliary overload spring sleeved over the tubular member of each shock absorber, one of said shoulders on said tubular member and means on said shock absorber engaging and supporting opposite ends of said overload spring, each of said shock absorbers being of a size and calibrated so as to effectively dampen the rebound movement of the main coil spring and the auxiliary coil spring adjacent thereto, non-metallic spacer means between each shock absorber and the auxiliary spring supported thereon for preventing metal-to-metal rubbing contact between the spring and shock absorber, the outside diameter of said auxiliary spring being sufficiently smaller than the inside diameter of the main coil spring through which it extends to insure clearance therebetween under automobile operating conditions and the outside diameter of each auxiliary spring being such that it is not substantially greater than the largest outside diameter of said tubular member on which it is mounted.

3. In an automobile front suspension system the combination including a chassis frame, a ground engaging wheel, upper and lower suspension control arms connected with said wheel and pivotally connected to said frame, a main suspension coil spring disposed between said lower control arm and said frame for yieldably supporting said frame relative to said wheel, a tubular direct acting hydraulic shock absorber extending through said coil spring and including a tubular pressure cylinder, a ported and valved piston slidably mounted in said pressure cylinder controlling the flow of fluid therethrough, a reserve tube concentrically surrounding said cylinder in spaced relation thereto and providing a reservoir for fluid, valve means controlling communication between the lower end of said pressure cylinder and said reservoir, a piston rod connected to said piston and extending beyond the upper end of said pressure cylinder, means closing the upper end of said pressure cylinder and reserve tube and slidably receiving said piston rod, means connecting the upper end of said piston rod with said chassis frame and the lower end of said pressure cylinder and reserve tube with said lower control arm, said reserve tube being shaped to provide a portion of maximum diameter adjacent the lower end thereof, a portion of intermediate diameter thereabove so as to provide an upwardly facing shoulder, and a portion of smaller diameter, an auxiliary overload coil spring sleeved over the smaller diameter upper portion of said reserve tube with its lower end seated on said reserve tube shoulder, a non-metallic spacer sleeved over the smallest diameter portion of said reserve tube and disposed between said shock absorber and the inside of said auxiliary spring to prevent metal-to-metal rubbing contact between said spring and said shock absorber, means connected with said piston rod adjacent the upper end thereof supporting the upper end of said auxiliary spring, said shock absorber valving being constructed so as to effectively dampen the rebound action of the main and auxiliary coil springs adjacent thereto, each of said auxiliary coil springs being out of interfering relationship with its adjacent main suspension spring and the outside diameter of said auxiliary coil spring being substantially the same diameter as the portion of maximum diameter of said reserve tube.

4. A device as described in claim 1 in which the coil spring is formed of rectangular wire having an outside diameter substantially the same as the largest diameter of said reserve chamber tube.

References Cited by the Examiner

UNITED STATES PATENTS

| 2,098,874 | 11/37 | Leighton | 267—20 |
| 2,123,087 | 7/38 | Leighton | 267—20 X |
| 2,385,891 | 10/45 | Swanson | 267—8 X |
| 2,874,955 | 2/59 | McIntyre et al. | 267—8 |
| 2,877,872 | 3/59 | Krizan | 267—8 X |

FOREIGN PATENTS

| 743,411 | 1/56 | Great Britain. |
| 1,023,345 | 1/58 | Germany. |

ARTHUR L. LA POINT, *Primary Examiner.*

ROBERT C. RIORDON, *Examiner.*